(12) United States Patent
Balakrishnan et al.

(10) Patent No.: US 10,142,065 B2
(45) Date of Patent: Nov. 27, 2018

(54) ENHANCED UE PERFORMANCE IN HETNET POOR COVERAGE SCENARIOS

(71) Applicant: Apple Inc., Cupertino, CA (US)

(72) Inventors: Swaminathan Balakrishnan, Santa Clara, CA (US); Prateek Sharma, Milpitas, CA (US); Deepankar Bhattacharjee, Milpitas, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 15/160,498

(22) Filed: May 20, 2016

(65) Prior Publication Data

US 2017/0078934 A1 Mar. 16, 2017

Related U.S. Application Data

(60) Provisional application No. 62/218,078, filed on Sep. 14, 2015.

(51) Int. Cl.
| | |
|---|---|
| *H04L 1/20* | (2006.01) |
| *H04W 36/00* | (2009.01) |
| *H04W 48/12* | (2009.01) |
| *H04W 36/04* | (2009.01) |
| *H04W 36/30* | (2009.01) |
| *H04W 84/04* | (2009.01) |
| *H04W 48/20* | (2009.01) |
| *H04W 88/06* | (2009.01) |

(52) U.S. Cl.
CPC ......... *H04L 1/203* (2013.01); *H04W 36/0083* (2013.01); *H04W 36/04* (2013.01); *H04W 36/30* (2013.01); *H04W 48/12* (2013.01); *H04W 48/20* (2013.01); *H04W 84/045* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 8,725,153 | B2* | 5/2014 | Dimou | H04W 36/0083 |
| | | | | 455/423 |
| 9,078,150 | B2* | 7/2015 | Jung | H04W 36/0083 |
| 9,344,932 | B2* | 5/2016 | Jung | H04W 36/0083 |
| 9,674,757 | B2* | 6/2017 | Yiu | H04W 4/70 |
| 2013/0021929 | A1* | 1/2013 | Kim | H04B 7/024 |
| | | | | 370/252 |
| 2013/0023302 | A1* | 1/2013 | Sivanesan | H04W 36/32 |
| | | | | 455/525 |
| 2013/0143578 | A1* | 6/2013 | Lekutai | H04W 36/0083 |
| | | | | 455/444 |

(Continued)

*Primary Examiner* — Donald L Mills
(74) *Attorney, Agent, or Firm* — Meyertons Hood Kivlin Kowert & Goetzel, P.C.; Jeffrey C. Hood

(57) ABSTRACT

This disclosure relates to techniques for enabling a user equipment (UE) to determine which cell to attach to in a heterogeneous network (HetNet). The UE may determine, based on the quality of the downlink (DL) channel and/or on the type of traffic between the UE and a current base station, whether to attach to a small cell base station or an overlay macro base station in the cellular network. Particularly, the UE may determine whether to use a received mobility offset during cell reselection in response to a measured quality of the DL channel.

20 Claims, 7 Drawing Sheets

(56) References Cited

U.S. PATENT DOCUMENTS

| | | | |
|---|---|---|---|
| 2014/0200001 A1* | 7/2014 | Song | H04W 36/0094 |
| | | | 455/436 |
| 2014/0213259 A1* | 7/2014 | Teyeb | H04W 36/0094 |
| | | | 455/436 |
| 2014/0220974 A1* | 8/2014 | Hsu | H04W 36/0088 |
| | | | 455/436 |
| 2014/0302853 A1 | 10/2014 | Militano et al. | |
| 2015/0031369 A1* | 1/2015 | Gunnarsson | H04W 36/04 |
| | | | 455/438 |
| 2015/0049672 A1 | 2/2015 | Luo et al. | |
| 2015/0049681 A1* | 2/2015 | Huang | H04W 72/1289 |
| | | | 370/329 |
| 2015/0050934 A1 | 2/2015 | Jung et al. | |
| 2015/0172977 A1 | 6/2015 | Koc et al. | |
| 2015/0173100 A1* | 6/2015 | Aydin | H04W 72/0426 |
| | | | 370/329 |
| 2015/0189603 A1* | 7/2015 | Weber | H04W 24/08 |
| | | | 370/252 |
| 2016/0255631 A1* | 9/2016 | Cui | H04W 72/1242 |
| | | | 370/329 |

* cited by examiner

ENHANCED UE PERFORMANCE IN HETNET POOR COVERAGE SCENARIOS

PRIORITY DATA

This application claims benefit of priority to U.S. Provisional Application Ser. No. 62/218,078, titled "Improved UE Performance in HetNet Poor Coverage Scenarios," filed Sep. 14, 2015 by Deepankar Bhattacharjee, Prateek Sharma, Sreevalsan Vallath, and Swaminathan Balakrishnan, which is hereby incorporated by reference in its entirety as though fully and completely set herein.

FIELD

The present application relates to wireless devices, including apparatuses, systems, and methods to determine which base station a user equipment will connect to.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services and may be used by a variety of applications.

Wireless communication systems generally employ a plurality of base stations that each provides a coverage area. A typical base station can transmit multiple data streams for broadcast, multicast, and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

With the proliferation of wireless communications, the use of multiple types of access nodes may be used across a wireless network or system. Such a network or system is referred to as a HetNet (or heterogeneous network). For example, a wireless system can include larger coverage wide area networks (macrocells, base stations, evolved Node Bs, etc.) that overlay one or more, smaller local area networks (access points, microcells, picocells, femtocells, etc.). HetNets can offer wireless coverage in an environment with a wide variety of wireless coverage zones, ranging from an open outdoor environment to office buildings, homes, underground areas, and combinations of these and others. In this way, a HetNet can be considered a network with complex interoperation between a macrocell, smaller cells, and in some cases WiFi network elements used together to provide a mosaic of coverage with mobile device handoff capability between network elements.

In general, a HetNet can be deployed to address one or more concerns, two of which are listed here for illustrative purposes only. First, a HetNet can help increase the coverage area of a typical, or stand-alone, cell. For example, HetNet deployment helps improve coverage in hard to reach areas within the network that cannot be easily or economically served by a macrocell deployment. Second, a HetNet can help increase the capacity of a typical cell. Wireless access network traffic may not be uniformly distributed throughout a network and there are generally areas within a wireless network deployment where subscribers are concentrated in small geographical area. An existing macrocell deployment may not be able to meet the capacity need of these densely subscribed areas. Such densely subscribed areas can be known as hotspots. In order to address the capacity need of hotspots, wireless operators are considering the dense deployment of small cells to meet the capacity need. The simultaneous deployment of small cells and macrocells in hotspot leads to HetNet deployment. Even though HetNet deployment helps solve capacity problems, it can introduce mobility and interference issues, to name a few.

Therefore, what are needed are techniques to help mitigate at least some of the mobility issues introduced by HetNet deployment.

Accordingly, improvements in the field would be desirable.

SUMMARY

Embodiments are presented herein of apparatuses, systems, and methods for optimizing user equipment (UE) performance in HetNet poor coverage scenarios. The UE may be able to decide whether to override mobility parameters received from the network in order to choose to move into or stay in better radio frequency (RF) coverage.

In at least some embodiments, a UE may receive a mobility offset from a cellular network. The UE may perform measurement of the downlink (DL) channel of one or more base stations, such as a macro base station and/or a small cell base station. Based on the current quality of the DL channel and/or on the type of traffic between the UE and the base station (e.g., downlink versus uplink), the UE may determine whether it should use the macro base station or if it should instead use the small cell base station. If the UE decides to use the macro base station, the UE may report the DL measurement, thereby ignoring the received mobility offset. The UE may subsequently receive instructions to attach to the macro base station. If the UE decides to use the small base station, the UE may modify the DL measurement with the received mobility offset and report the modified DL measurement to the network. The UE may subsequently receive instructions to attach to the small base station.

The techniques described herein may be implemented in and/or used with a number of different types of devices, including but not limited to cellular base stations, mobile management entities (MMEs), and other cellular core network entities, as well as user equipment devices such as mobile phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
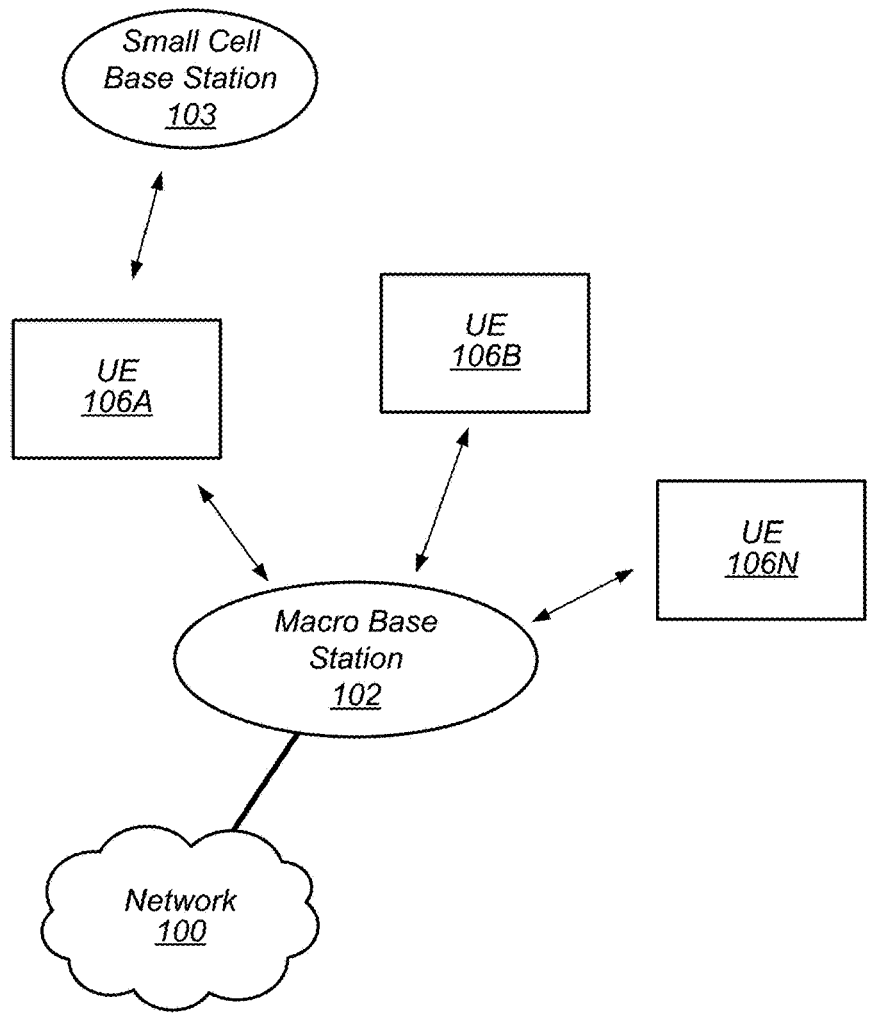
FIG. 1 illustrates an example (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present patent application:
  UE: User Equipment
  BS: Base Station
  ENB: eNodeB (Base Station)
  GSM: Global System for Mobile Communication
  UMTS: Universal Mobile Telecommunication System
  LTE: Long Term Evolution
  CS: Circuit-switched
  PS: Packet-switched
  CSFB: Circuit-switched fallback
  MME: Mobile Management Entity
  MSC: Mobile Switching Center
  RNC: Radio Network Controller
  OAM: Operations, Administration, and Management
  RRC: Radio Resource Control
  MT: Mobile Terminating
  MTRF: Mobile Terminating Roaming Forwarding
Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (e.g., smart watch, smart glasses), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
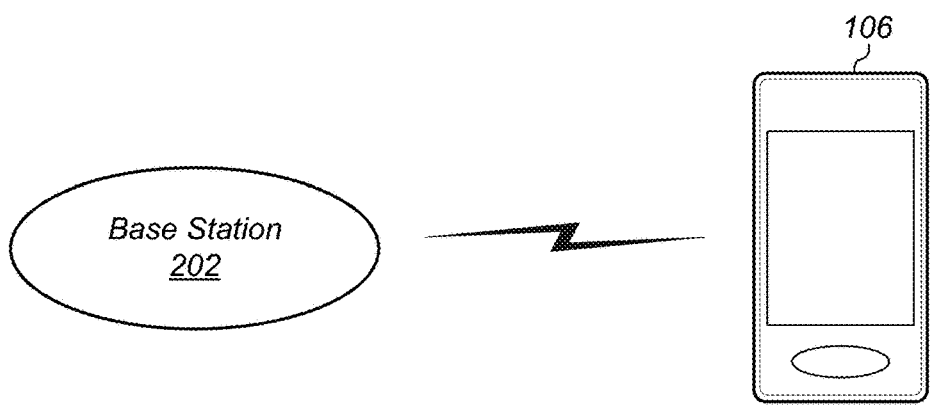
FIG. 2 illustrates a base station in communication with user equipment (UE), according to some embodiments.
Figure 3:
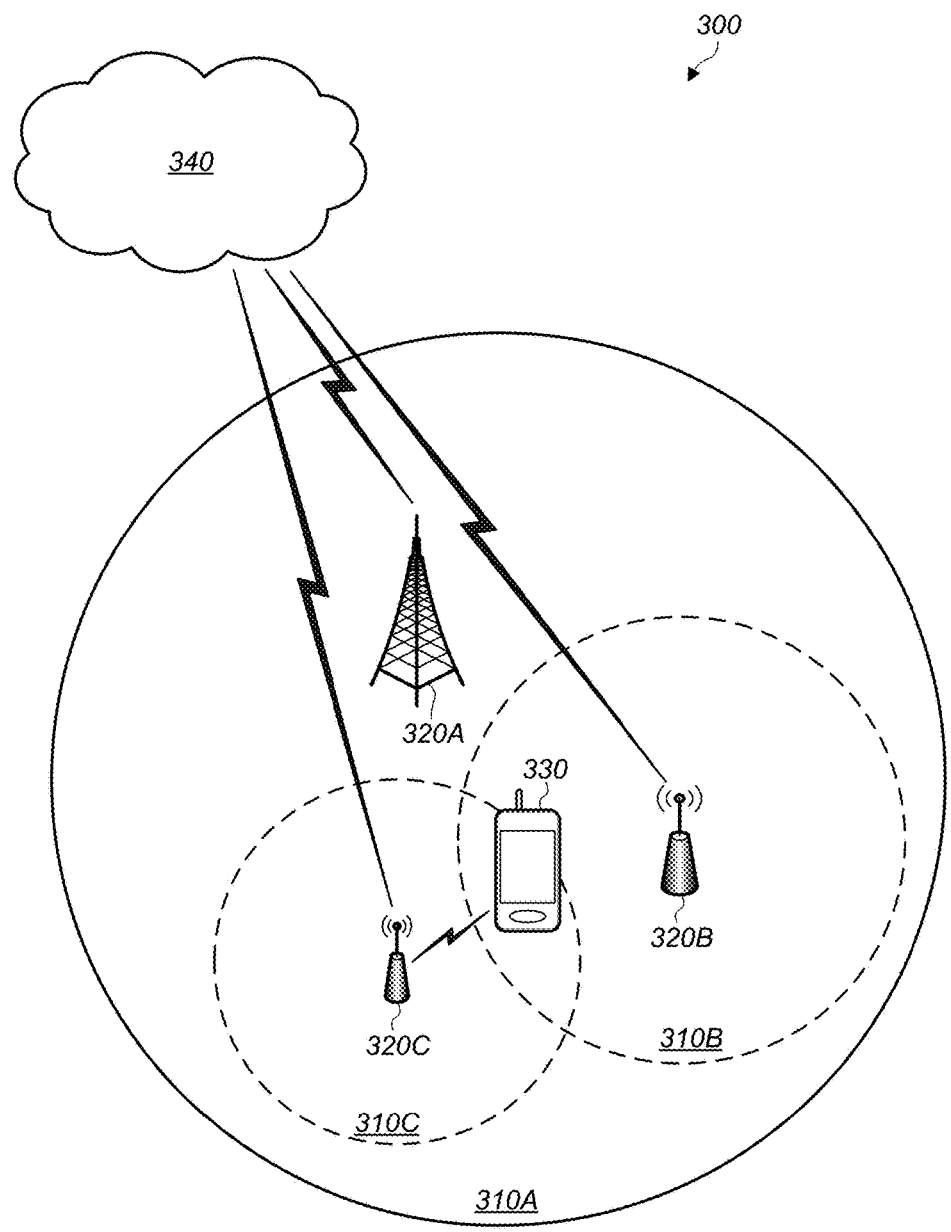
FIG. 3 illustrates an example HetNet cellular network system, according to some embodiments.

FIGS. 1-3—Communication System

FIG. 1 illustrates an example (and simplified) wireless communication system, according to some embodiments. It is noted that the system of FIG. 1 is merely one example of a possible cellular communication system, and embodiments of the subject matter may be implemented in any of various systems as desired.

As shown, the example wireless cellular communication system includes a macro base station 102, which communicates over a transmission medium with one or more user devices 106A through 106N. Each of the user devices may be referred to herein as a "user equipment" (UE). Thus, the user devices 106 are referred to as UEs or UE devices.

The macro base station 102 may be a base transceiver station (BTS) or cell site, and may include hardware that enables wireless cellular communication with the UEs 106A through 106N. The macro base station 102 may also be equipped to communicate with a network, such as network 100. Thus, the macro base station 102 may facilitate communication between the UEs and/or between the UEs and the network. The communication area (or coverage area) of each base station may be referred to as a "cell." The macro base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G, or future telecom standards. Macro base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. Other possible wireless communication technologies include wireless local area network (WLAN or Wi-Fi), WiMAX, etc.

In a heterogeneous network (HetNet), there may be one or more additional base stations. One or more of these additional base stations may be a small cell, such as small cell base station 103. Such small cells may be used to spread traffic loads and/or to widely maintain performance and service quality while efficiently reusing spectrum. For example, a small cell may be added to increase capacity in hot spots (e.g., areas with high user demand per unit area) and/or to fill in areas not sufficiently covered by the macro network, including both outdoor and indoor areas. A small cell in a HetNet may improve network performance and/or service quality by, for example, allowing for offloading of cell traffic from the larger macro cells. Thus, a HetNet that uses small cells in combination with larger, macro cells may provide increased bitrates per unit area.

Note that these small cells may be serviced via low-power base stations as compared to a macro base station. In HetNets, the cells of various sizes may be referred to as macro cells, micro cells, pico cells, and femto cells, listed in order of decreasing base station power. Any reference herein to a small cell may refer to a micro cell, a pico cell, a femto cell, or any other cell smaller than a macro cell. Note also that the actual size of the cell depends not only on the power of the base station, but also on other factors, including antenna position and the local environment (e.g., terrain type/elevation, building/structural interference, etc.).

In some embodiments, UE 106 may be capable of communicating using multiple radio access technologies (RATs). For example, the UE 106 might be configured to communicate using two or more of GSM, UMTS, LTE, LTE-Advanced CDMA2000, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates a base station in communication with user equipment, according to some embodiments. User equipment 106 (e.g., one of the devices 106A through 106N) may be in communication with the base station 202. Base station 202 may be a macro base station (e.g., macro base station 102) or a small cell base station (e.g., small cell base station 103). As defined above, the UE 106 may be a device with wireless cellular network connectivity such as a mobile phone, a hand-held device, a computer, a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array), or some combination thereof.

The base station, such as the processing element in the base station, may be configured to perform methods for optimizing UE performance in HetNet poor coverage scenarios, as further described below. Other cellular network devices, described below, may also be configured to perform methods for optimizing UE performance in HetNet poor coverage scenarios, possibly in conjunction with the base station.

The UE may include a processing element such as one or more of a processor, an ASIC (application specific integrated circuit), an FPGA (field-programmable gate array), or some combination thereof. The UE, such as the processing element in the UE, may be configured to perform methods for optimizing UE performance in HetNet poor coverage scenarios, as further described below.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 may be configured to communicate using either of a first radio access technology which provides packet-switched (PS) services but not circuit-switched (CS) services and a second radio access technology which provides PS services and CS services. If the UE 106 is using the first radio access technology and a CS call is initiated or received, the UE 106 may be capable of switching to use of the second radio access technology in order to establish the call.

The UE may be associated with, e.g., subscribe to, a cellular carrier. Examples of cellular carries in the United States include Verizon, AT&T, Sprint, and T-Mobile. In some embodiments, the UE may subscribe to a home carrier that does not support handover from packet-switched network to a circuit-switched network during an ongoing call.

FIG. 3 illustrates an example HetNet cellular network system, according to some embodiments. As shown in FIG. 3, a mobile device (handset, UE, laptop, tablet, etc.) 330 is within the coverage area of HetNet 300. HetNet 300 can include multiple network coverage pieces. For example, the largest coverage area may be a macro cell (eNB, base station, etc.) 310A. Within (or at least partially within) macro cell 310A coverage area, there may concurrently exist one or more sub-cell or small cell coverage areas. As shown, small cells 310B and 310C are within (or partially within) macro cell 310A and, further, at least partially overlap each other. Each cell 310 may also include some sort of network access device 320A, 320B, and 320C, such as a base station or an access point. Each network access device 320 may communicate with one or more mobile devices 330, as well as with a core network 340. Not shown are possible intermediate network components or system elements that may be between a network access device 320 and the core network 340. In some embodiments, mobile device 330 may be moving within macro cell 310A and moving out of small cell 310B coverage area and into small cell 310C coverage area. In this way, the mobile device 330 may possibly communicate with all three cells: macro cell 310A, small cell 310B, and/or small cell 310C.

In certain embodiments, a HetNet system may include many small cells overlapping or within, a macro cell. Mobile devices, such as user equipment (UE), within the range of a small cell inside a HetNet are typically able to communicate with both the overlay macro cell and one or more nearby small cells. In a network with a frequency reuse of one (indicating that a base station may use the whole system bandwidth for transmission), such as an LTE network, a UE may normally camp on the cell with the strongest received downlink (DL) signal. In such a scenario, a border between two cells (e.g., between an overlay macro cell and a small cell) may be located at a series of points at which the strongest received DL signal is the same (or approximately the same) for both cells. Referring to FIG. 3, such a border (that is, a border measured by the strongest received DL signal as described above) between cell 310A and cell 310C may be the dashed circle surrounding cell 310C. Note that the border may not actually be circular, but instead may be any shape (as explained above, the actual size of a cell depends on various factors, including base station power and local environmental factors).

In a homogeneous network, the point at which a UE receives equal DL signal strength from two neighboring cells (that is, at the border between these two cells) may also coincide (or substantially coincide) with the point of equal path loss for the uplink (UL) in both cells. In HetNet, however, this coincidence may not hold true. In other words, in a HetNet with a higher power node servicing an overlay macro cell and a lower power node servicing a small cell, the point of equal DL signal strength may not necessarily be the same as the point of equal UL path loss. The point of equal UL path loss may actually extend further from the small base station than does the point of equal DL signal strength. In reference to FIG. 3, for example, a point of equal UL path loss as between network access device 320A and network access device 320C may be, for example, a circle with a larger diameter than that indicated by the dashed line surrounding cell 310C.

As noted above, a small cell may be added to a network for various reasons (e.g., to increase capacity and/or service quality). One method to realize some of the benefits of a HetNet is to ensure that small cells serve a number of users, for example by increasing the size of the area served by the small cell. In some embodiments, this may be accomplished by cell range extension (CRE). CRE may use a positive cell selection offset to the DL signal strength of the small cell in order to induce UEs to connect to the small cell. That is, an offset may be added to the DL signal strength of the small cell such that the border between the small cell and the macro cell is extended further from the small cell base station (e.g., the DL signal strength of the small cell plus the received offset is equal to the DL signal strength of the macro cell). Note that a UE operating in the CRE region of a small cell may still experience less UL path loss as compared to the UL path loss associated with the overlay macro cell. In some embodiments, UEs operating within the CRE region of the small cell may experience increased interference on the DL.

Figure 4:
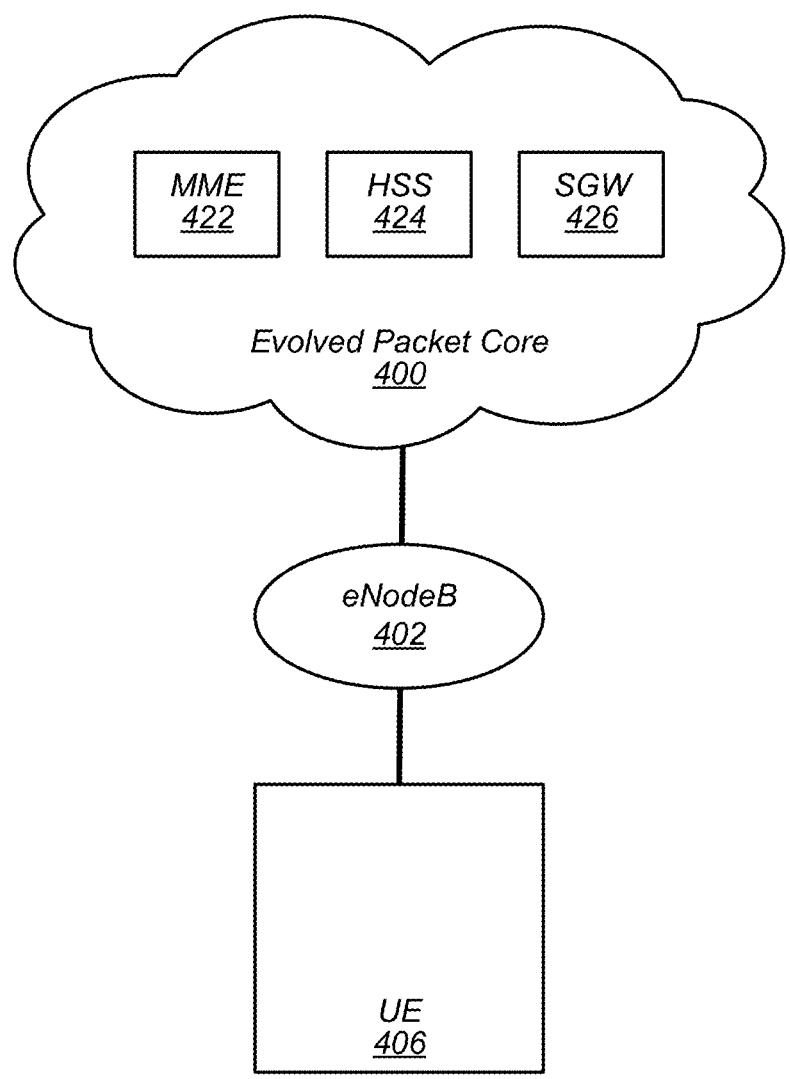
FIG. 4 illustrates an example cellular network system, according to some embodiments.

FIG. 4 illustrates an example cellular network system, according to some embodiments. As shown, the UE 106 may be in communication with a cellular network, where the cellular network may include a base station 102 and an evolved packet core (EPC) 100, as shown, among other possible elements. The base station is shown in this example embodiment as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may include various other devices known to those skilled in the art as well.

Operations described herein as being performed by the cellular network may be performed by one or more of the cellular network devices shown in FIG. 3, such as one or more of base station, 102, MME 322, HSS 324, or SGW 326 in EPC 100, among possible others.

Figure 5:
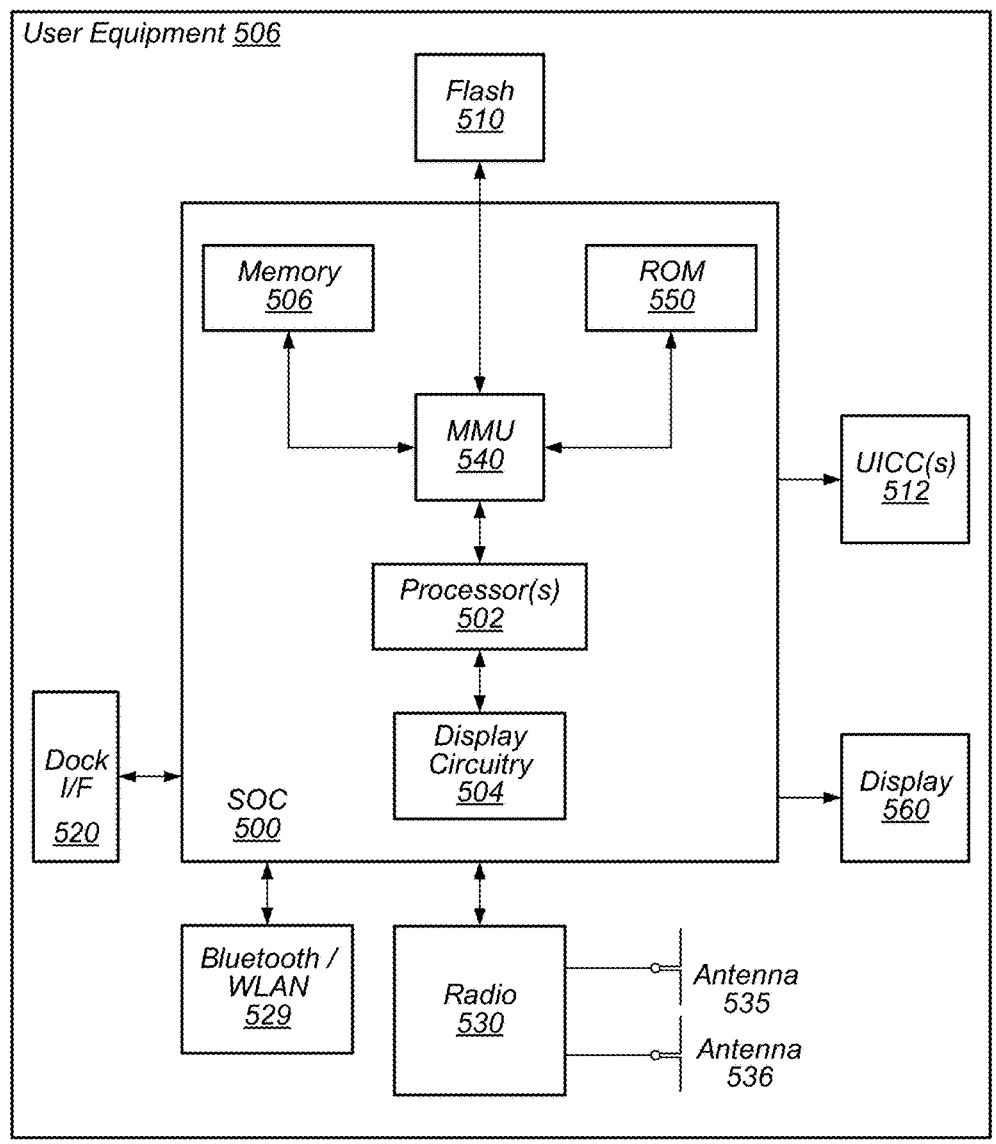
FIG. 5 illustrates an example block diagram of a UE, according to some embodiments.

FIG. 5—Example Block Diagram of a UE

FIG. 5 illustrates an example block diagram of a UE, according to some embodiments. As shown, the UE 506 may include a system on chip (SOC) 500, which may include portions for various purposes. For example, as shown, the SOC 500 may include a processing element, such as processor(s) 502, which may execute program instructions for the UE 506, and display circuitry 504, which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, radio 530 (which may include one or more cellular radios), Bluetooth/WLAN circuitry 529 (which may include one or more short to medium range wireless communication radios), dock I/F 520, and/or display 560. The MMU 540 may be configured to perform memory protection and page table translation or set up. In some embodiments, the MMU 540 may be included as a portion of the processor(s) 502.

In the embodiment shown, ROM 550 may include a bootloader, which may be executed by the processor(s) 502 during boot up or initialization. As also shown, the SOC 500 may be coupled to various other circuits of the UE 506. For example, the UE 506 may include various types of memory (e.g., including Flash memory 510), a dock interface 520 (e.g., for coupling to the computer system), the display 560, and wireless communication circuitry (e.g., for LTE, LTE-A, CDMA2000, GSM, Bluetooth, Wi-Fi, etc.).

The UE device 506 may include at least one antenna, and in some embodiments multiple antennas, for performing wireless cellular communication with base stations and/or wireless communication with other devices. For example, the UE device 506 may use antenna 535 to perform the wireless cellular communication and may use antenna 536 for other wireless communication. As noted above, the UE may be configured to communicate wirelessly using multiple wireless communication standards (multiple RATs) in some embodiments.

As described herein, the UE 506 may include a processing element, e.g., hardware and/or software components for implementing methods according to embodiments of this disclosure.

The processing element of the UE device 506 may be processor 502 configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

Figure 6:
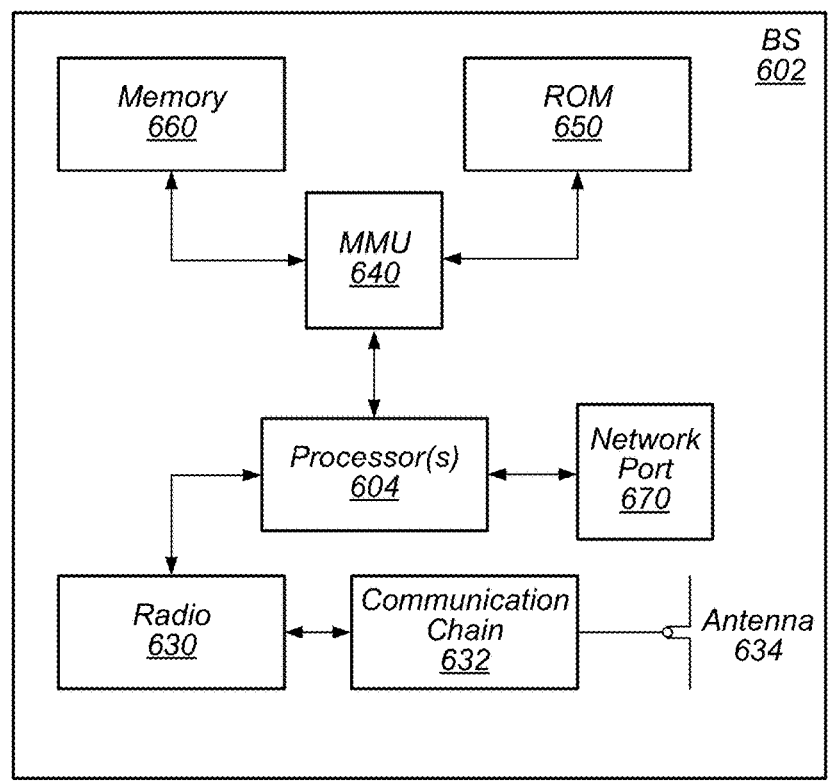
FIG. 6 illustrates an example block diagram of a base station, according to some embodiments.

FIG. 6—Example Block Diagram of a Base Station

FIG. 6 illustrates an example block diagram of a base station, according to some embodiments. It is noted that the base station of FIG. 6 is merely one example of a possible base station. As shown, the base station 602 may include a processing element, such as processor(s) 604 which may execute program instructions for the base station 602. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The base station 602 may include at least one network port 670. The network port 670 may be configured to couple to a telephone network and provide a plurality of devices, such as UE devices 606, access to the telephone network as described above.

The network port 670 (or an additional network port) may also or alternatively be configured to couple to a cellular network, e.g., a core network of a cellular service provider. The core network may provide mobility related services and/or other services to a plurality of devices, such as UE devices 606. In some cases, the network port 670 may couple to a telephone network via the core network, and/or the core network may provide a telephone network (e.g., among other UE devices 606 serviced by the cellular service provider).

The base station 602 may include at least one antenna 634. The at least one antenna 634 may be configured to operate as a wireless transceiver and may be further configured to communicate with UE devices 606 via radio 630. The antenna 634 communicates with the radio 630 via communication chain 632. Communication chain 632 may be a receive chain, a transmit chain or both. The radio 630 may be configured to communicate via various RATs, including, but not limited to, GSM, UMTS, LTE, LTE-A, WCDMA, CDMA2000, etc.

The processing element, such as processor(s) 604, of the base station 602 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Determining Whether to be Served at a Macro eNB or a Small Cell Base Station

In some scenarios, it may be desirable to allow a UE to determine (or influence the determination as to) which base station (that is, to which cell) the UE will connect to (or camp on) in a HetNet. The method that a UE may use to accomplish this goal may be different depending on whether the UE is in idle mode or connected mode.

Figure 7:
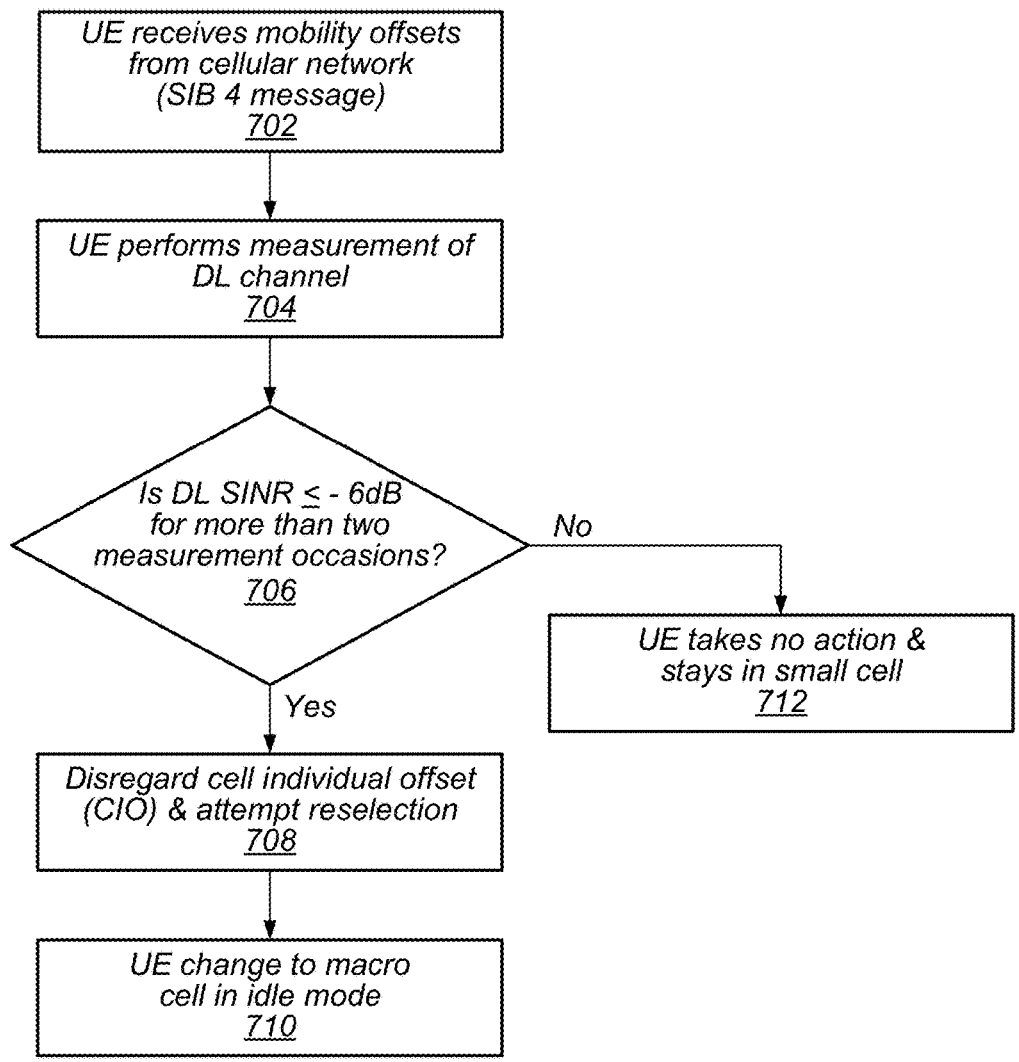
FIG. 7 is a flowchart diagram of a method by which a UE in idle mode may determine whether to use a macro base station or a small cell base station, according to some embodiments.

FIG. 7 illustrates a flowchart diagram of a method by which a UE in idle mode may determine whether to use a macro base station or a small cell base station, according to some embodiments. Referring to FIG. 7, when in idle mode, the UE may be configured to receive, at 702, at least one mobility offset from a first base station in the cellular network (e.g., from an overlay macro base station or from one or more small base stations in the HetNet). The mobility offset may be received via a SIB 4 message. The mobility offset may be specified for use in selecting a cell when performing cell reselection according to one or more telecommunication standards. The mobility offset may be specified for use by the UE in adjusting a measurement report submitted by the UE to the base station. The measurement report may include one or more DL signal strength measurements corresponding to respective one or more base stations in the network as measured by the UE. These DL signal strength measurements may be modified by addition of the received mobility offset before being submitted in the measurement report to the network.

At 704, the UE may measure a quality of a downlink channel between the UE and the first base station. The UE may measure various qualities that correspond to the DL channel between the UE and the first base station, including, for example, the signal to noise ratio (SINR). The UE may perform these measurements a number of times (e.g., at set intervals and/or over a given time period).

At 706, the UE may compare the measured quality of the downlink channel to a predetermined threshold. For example, the UE may determine whether the quality falls below a certain standard (e.g., whether the SINR of the DL channel falls below a threshold).

If the measurement of the quality of the DL channel falls below this threshold, then the UE may determine that it should switch to another cell in the network. In other words, the UE may decide that, based on the measurement of the DL channel (e.g., the SINR of the DL channel), the UE would be better served by switching to a new cell in the network. This may be, for example, because the UE is camped on a small cell in the network, but has determined (based on the measurements) that the connection to the small cell is too tenuous. If the UE has determined that the measured quality of the DL channel has fallen below the threshold, then 708 continues with the UE beginning cell reselection, wherein the cell reselection does not use the at least one mobility offset. In other words, because the UE has determined that the DL channel of the current connection is too poor, the UE will disregard the cell individual offset when performing cell reselection. The UE may thus compare the DL signal strength of the current cell (e.g., the small cell) to the DL signal strength of another cell in the network (e.g., an overlay macro cell) in determining to which cell to connect without use of the received mobility offset. At 710, the UE may change from being camped on the first cell to camping on a second cell in response to the cell reselection.

If, on the other hand, the UE at 706 determines that the measured quality of the DL channel does not fall below the threshold, the UE may take no action and remain camped on the first cell (e.g., a small cell).

Figure 8:
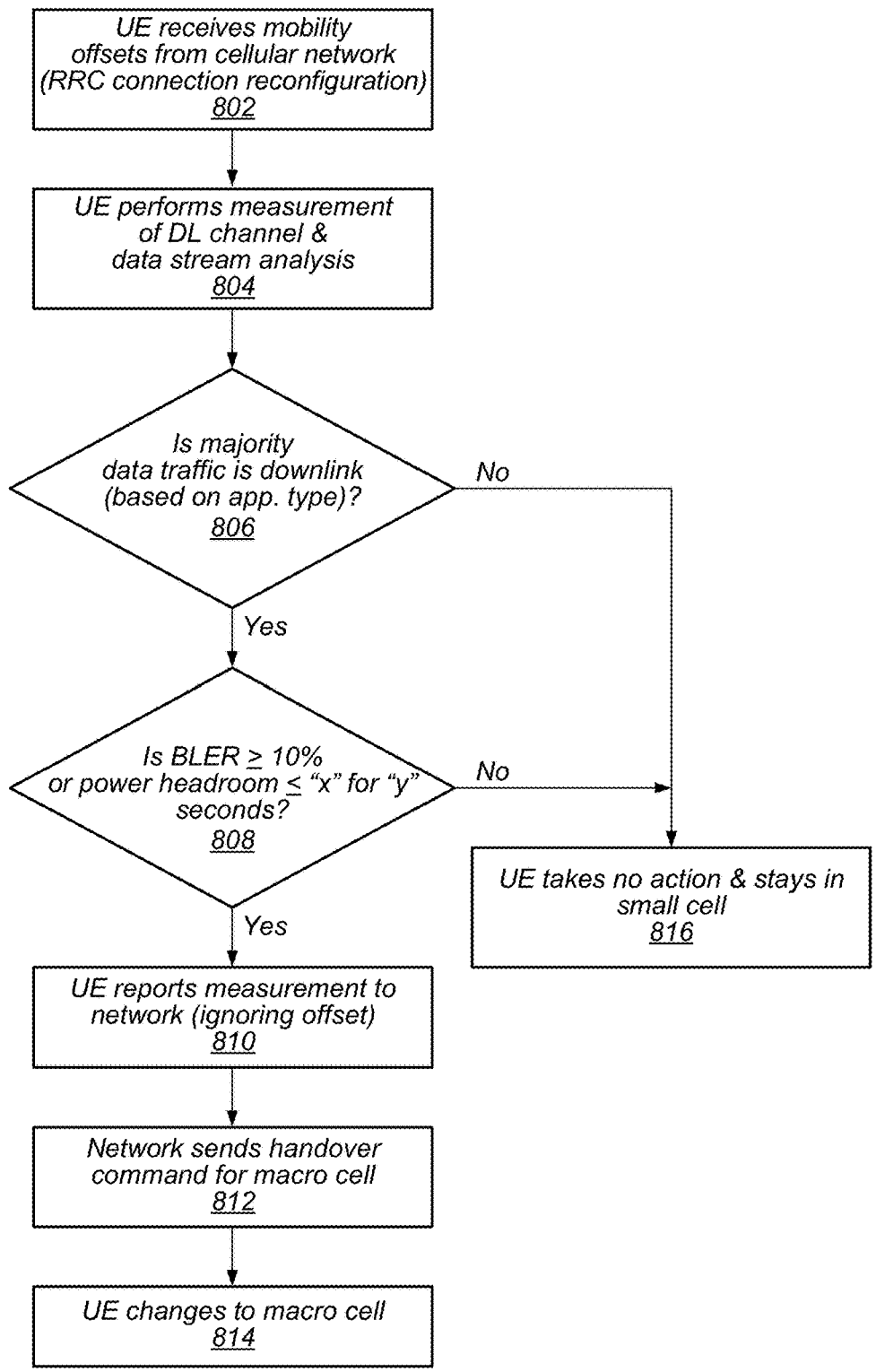
FIG. 8 is a flowchart diagram of a method by which a UE in connected mode may determine whether to use a macro base station or a small cell base station, according to some embodiments.

FIG. 8 illustrates a flowchart diagram of a method by which a UE in connected mode may determine whether to use a macro base station or a small cell base station, according to some embodiments. Referring to FIG. 8, when in connected mode, the UE may be configured to receive, at 802, at least one mobility offset from a first base station in the cellular network (e.g., from an overlay macro base station or from one or more small base stations in the HetNet). The mobility offset may be received via an RRC connection reconfiguration message.

At 804, the UE may measure a quality of a downlink channel between the UE and the first base station and also perform an analysis of the data stream (e.g., the UE may determine a DL portion of the data stream and a UL portion of the data stream) between the UE and the first base station. The UE may measure various qualities that correspond to the DL channel between the UE and the first base station, including, for example, a block error rate (BLER) and/or a power headroom of the UE. The UE may perform these measurements a number of times (e.g., at set intervals and/or over a given time period).

At 806, the UE may determine, based on the data stream analysis whether a DL portion of the data stream exceeds a given threshold. The data stream analysis may be determined based on the type(s) of application(s) running on the UE. If the DL portion of the data stream exceeds the threshold, then, at 808, the UE may compare the measured quality of the downlink channel to a predetermined threshold. For example, the UE may determine whether the quality falls below a certain standard (e.g., whether the BLER of the DL channel exceeds an allowable BLER or whether the power headroom is less than a given threshold for a certain time period).

If the measurement of the quality of the DL channel falls below this threshold, then the UE may determine that it should switch to another cell in the network. In other words, the UE may decide that, based on the data stream analysis and/or on the measurement of the DL channel (e.g., the SINR of the DL channel), the UE would be better served by switching to a new cell in the network. This may be, for example, because the UE is camped on a small cell in the network, but has determined that, based on the measurements, that the connection to the small cell is too tenuous and/or that the DL traffic is sufficiently large such that the small cell is not preferable to another cell in the network.

If one or both of these conditions has been met, then, at 810, the UE may report the measurement of the DL channel to the network, wherein the measurement is not modified by the mobility offset. In other words, because the UE has determined that the DL channel of the current connection is too poor and/or that the DL data stream is sufficiently large, the UE will disregard the mobility offset when reporting the measurement to the network. By disregarding the mobility offset, the UE may thus influence the network regarding whether or not the UE will receive a handover command from the network. At 812, the UE may receive a handover command from the network (e.g., from an overlay macro cell in the network). At 814, the UE may change from being camped on the first cell (e.g., a small cell) to camping on a second cell (e.g., the overlay macro cell) in response to the handover command.

If, on the other hand, the UE at 806 determines that the DL portion of the data stream does not exceed the threshold, then at 816 the UE may take no action and remain camped on the first cell (e.g., a small cell). Similarly, if, at 808, the UE determines that the measurement of the quality of the DL channel does not fall below the threshold, then at 816 the UE may remain camped on the first cell (e.g., a small cell).

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
an antenna;
a radio coupled to the antenna; and
a processing element coupled to the radio;
wherein the UE is configured to:
receive at least one mobility offset from a first base station in a cellular network, wherein the UE is camped on a first cell, wherein the at least one received mobility offset specifies an adjustment for use by the UE in adjusting a measurement report submitted by the UE to the base station;
measure a quality of a downlink channel between the UE and the first base station;
compare the measured quality of the downlink channel to a threshold; and
in response to the measurement of the downlink channel being less than or equal to the threshold:
begin cell reselection, wherein to perform the cell reselection the UE is configured to submit the measurement report to the base station, wherein the measurement report does not include the adjustment specified by the at least one received mobility offset, wherein the submission of the measurement report without the adjustment specified by the at least one received mobility offset influences cell reselection; and
change from being camped on the first cell to camping on a second cell in response to the cell reselection.

2. The UE of claim 1,
wherein the first cell is a small cell and wherein the second cell is a macro cell.

3. The UE of claim 1,
wherein the at least one received mobility offset is specified for use in selecting a cell when performing cell reselection according to a telecommunication standard.

4. The UE of claim 1,
wherein, in comparing the measured quality of the downlink channel to a threshold, the UE is configured to determine whether a downlink channel between the first base station and the UE has a signal to interference and noise ratio (SINK) that is less than a threshold for at least two measurement occasions.

5. The UE of claim 1,
wherein, in response to the measurement of the downlink channel being more than the threshold, the UE is configured to modify the measured quality of the downlink channel using the at least one received mobility offset and report the modified quality to the base station.

6. The UE of claim 5,
wherein said modification of the measured quality of the downlink channel comprises adding the adjustment specified by the at least one received mobility offset to the measured quality of the downlink channel.

7. The UE of claim 1, wherein the UE is located in a cell range extension (CRE) region of the first cell.

8. The UE of claim 1,
wherein the at least one received mobility offset is a positive cell selection offset configured to induce the UE to remain camped on the first cell.

9. The UE of claim 1,
wherein the measurement report includes the measured quality of the downlink channel.

10. An apparatus for inclusion in a user equipment (UE), comprising;
a memory; and
at least one processing element coupled to the memory, wherein the at least one processing element is configured to:
receive at least one received mobility offset from a first base station in a cellular network, wherein the UE is camped on a first cell, wherein the at least one received mobility offset specifies an adjustment for use by the UE in adjusting a measurement report submitted by the UE to the base station;
measure a quality of a downlink channel between the UE and the first base station;
compare the measured quality of the downlink channel to a threshold; and
in response to the measurement of the downlink channel being less than the threshold:
begin cell reselection, wherein to perform the cell reselection the at least one processing element is further configured to submit the measurement report to the base station, wherein the measurement report does not include the adjustment specified by the at least one received mobility offset as specified by the cellular network, wherein the submission of the measurement report without the adjustment specified by the at least one received mobility offset influences cell reselection; and
change from being camped on the first cell to camping on a second cell in response to the cell reselection.

11. The apparatus of claim 10,
wherein the first cell is a small cell and wherein the second cell is a macro cell.

12. A user equipment (UE), comprising:
an antenna;
a radio coupled to the antenna; and
a processor coupled to the radio;
wherein the UE is configured to:
receive at least one received mobility offset from a first base station in a cellular network, wherein the UE is camped on a first cell, wherein the at least one mobility offset is specified by the cellular network and specifies an adjustment for a measurement report submitted by the UE to the base station;
analyze a data stream between the UE and the first base station;
in response to a downlink percentage of the data stream being more than a first threshold, transmit a measurement report to the base station, wherein the measurement report does not include the adjustment specified by the at least one received mobility offset, wherein the transmission of the measurement report without the adjustment specified by the at least one received mobility offset influences handover;

receive a handover command from the cellular network, wherein the handover command indicates a second cell in the cellular network; and change from being camped on the first cell to camping on the second cell in response to receiving the handover command.

13. The UE of claim 12,
wherein the at least one received mobility offset is specified for use in adjusting the measurement report according to a telecommunication standard.

14. The UE of claim 12,
wherein, in response to the downlink percentage of the data stream being less than the first threshold, the UE is configured to modify the measured quality of the downlink channel using the at least one received mobility offset and report the modified quality to the base station.

15. The UE of claim 12,
wherein the at least one received mobility offset is specified for use by the UE to influence the UE in remaining camped on the first cell.

16. The UE of claim 12,
wherein, in response to an uplink percentage of the data stream being greater than a second threshold, the UE is configured to modify the measured quality of the downlink channel using the at least one received mobility offset and report the modified quality to the base station.

17. The UE of claim 12,
wherein the UE is further configured to:
measure a quality of a downlink channel between the UE and the first base station; and in response to the measured quality of the downlink channel exceeding a second threshold, transmit the measurement report to the base station, wherein the measurement report is not adjusted using the at least one received mobility offset.

18. The UE of claim 17,
wherein the measured quality of the downlink channel includes a block error rate (BLER) of the downlink channel, and wherein the second threshold indicates a maximum BLER.

19. The UE of claim 17,
wherein the measured quality of the downlink channel includes a power headroom of the UE, and wherein the second threshold indicates a minimum power headroom over a determined time period.

20. The UE of claim 17,
wherein, in response to the measured quality of the downlink channel not exceeding the second threshold, the UE is configured to remain camped on the first cell.

* * * * *